United States Patent
Redfern et al.

(10) Patent No.: US 9,519,689 B2
(45) Date of Patent: *Dec. 13, 2016

(54) DISAMBIGUATION FRAMEWORK FOR INFORMATION SEARCHING

(71) Applicant: INTELLIRESPONSE SYSTEMS INC., Toronto (CA)

(72) Inventors: Darren Redfern, Stratford (CA); Chad Ternent, Kitchener (CA)

(73) Assignee: IntelliResponse Systems Inc., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/615,139

(22) Filed: Feb. 5, 2015

(65) Prior Publication Data

US 2015/0154201 A1 Jun. 4, 2015

Related U.S. Application Data

(63) Continuation of application No. 13/623,431, filed on Sep. 20, 2012, now Pat. No. 9,009,169.

(51) Int. Cl.
*G06F 17/30* (2006.01)

(52) U.S. Cl.
CPC ..... *G06F 17/3053* (2013.01); *G06F 17/30424* (2013.01); *G06F 17/30528* (2013.01)

(58) Field of Classification Search
CPC ............ G06F 17/3053; G06F 17/30424; G06F 17/30528
USPC ................................ 707/723, 748, 749, 759
See application file for complete search history.

(56) References Cited

U.S. PATENT DOCUMENTS

| | | | | |
|---|---|---|---|---|
| 7,171,409 B2* | 1/2007 | Craig | ................ | G06F 17/30616 704/9 |
| 7,206,778 B2* | 4/2007 | Bode | ................ | G06F 17/30672 707/999.004 |
| 7,337,176 B1* | 2/2008 | Cheedella | ......... | G06F 17/30563 707/E17.005 |

(Continued)

OTHER PUBLICATIONS

Koutrika and Ioannidis, "A unified user profile framework for query disambiguation and personalization", UM Workshop on New Technologies for Personalized Information Access (PIA), 2005, (10 pages).

(Continued)

*Primary Examiner* — Phong Nguyen

(57) ABSTRACT

Methods, software and devices for responding to a user query are disclosed. A user query received from a user is matched to stored responses to obtain initial matched responses. A confidence metric indicating the likelihood of the initial matched responses satisfying the user query is calculated. Upon determining the confidence metric to be below a specified threshold, the user query is supplemented with contextual data. The user query, supplemented by contextual data, is further matched to stored responses by applying disparate matching techniques to obtain further matched responses, where at least one of the disparate matching techniques differs from techniques used to obtain the initial matched responses. Degree-of-match metrics are calculated taking into account the contextual data, where each degree-of-match metric indicates a quality of match between the user query and a matched response. At least one of the matched responses is presented to the user.

18 Claims, 10 Drawing Sheets

(56) References Cited

U.S. PATENT DOCUMENTS

| | | | |
|---|---|---|---|
| 7,562,069 B1* | 7/2009 | Chowdhury | G06F 17/30864 707/999.003 |
| 7,805,441 B2 | 9/2010 | Madhavan et al. | |
| 2002/0010715 A1* | 1/2002 | Chinn | G06F 3/16 715/236 |
| 2003/0115187 A1* | 6/2003 | Bode | G06F 17/30672 707/999.003 |
| 2008/0195601 A1* | 8/2008 | Ntoulas | G06F 17/30622 707/999.005 |
| 2008/0275859 A1* | 11/2008 | Griffith | G06F 17/3071 707/999.004 |
| 2009/0157516 A1* | 6/2009 | Babu | G07G 1/14 705/16 |
| 2009/0222444 A1* | 9/2009 | Chowdhury | G06F 17/30864 707/999.005 |
| 2010/0205198 A1* | 8/2010 | Mishne | G06F 17/30864 707/759 |
| 2010/0299336 A1* | 11/2010 | Bergstraesser | G06Q 30/0256 707/759 |
| 2011/0161341 A1 | 6/2011 | Johnston | |
| 2011/0282890 A1* | 11/2011 | Griffith | G06F 17/3064 707/758 |
| 2013/0173599 A1* | 7/2013 | Chowdhury | G06F 17/30864 707/722 |
| 2014/0075085 A1* | 3/2014 | Schroder | G06F 13/4022 710/317 |

OTHER PUBLICATIONS

Mihalkova and Mooney, "Search query disambiguation from short sessions", Beyond Search: Computational Intelligence for the Web Workshop at NIPS, 2008, (2 pages).

Nguyen, "Office Action", mailed Apr. 10, 2014, in related U.S. Appl. No. 13/623,431, filed Sep. 20, 2012.

Nguyen, "Notice of Allowance", mailed Dec. 1, 2014, in related U.S. Appl. No. 13/623,431, filed Sep. 20, 2012.

* cited by examiner

State to Technique Matrix

| | No Answer | 1 Answer | 2+ Answer | Specific Query | Vague Query | Asked in Context | Asked out of Context | Multiple Contexts | Single Context | 2+ Query Session | 2 Query Session | 1 Query Session |
|---|---|---|---|---|---|---|---|---|---|---|---|---|
| Standard | +1 | | | | | | x0 | | | | | |
| Cross-Context | | | -1 | | | | | | x0 | | | |
| Previous Query (1) | | | -1 | -1 | +1 | | x0 | | | | | x0 |
| Previous Query (2) | | | x0 | -1 | +1 | | x0 | | | | x0 | x0 |
| Previous Query (1) & Cross-Context | | | x0 | -1 | | | | | x0 | | | x0 |
| Previous Query (2) & Cross-Context | | | x0 | -1 | | | | | x0 | | x0 | x0 |

FIG. 5

| | State to Technique Matrix | | | | | | | | | | | | Weight | | |
|---|---|---|---|---|---|---|---|---|---|---|---|---|---|---|---|
| | No Answer | 1 Answer | 2+ Answer | Specific Query | Vague Query | Asked in Context | Asked out of Context | Multiple Contexts | Single Context | 2+ Query Session | 2 Query Session | 1 Query Session | Default Technique Weight | Modifier | Modified Technique Weight |
| Standard | | | | | | | | | | | | | 5 | N/A | 5 |
| Cross-Context | +1 | | -1 | | | | x0 | | x0 | | | | 4 | N/A | 4 |
| Previous Query (1) | | | -1 | -1 | +1 | | x0 | | | | | x0 | 3 | +1 | 4 |
| Previous Query (2) | | | x0 | -1 | +1 | | x0 | | | | x0 | x0 | 2 | x0 | 0 |
| Previous Query (1) & Cross-Context | | | x0 | -1 | | | | | x0 | | | x0 | 2 | N/A | 2 |
| Previous Query (2) & Cross-Context | | | x0 | -1 | | | | | x0 | | x0 | x0 | 1 | x0 | 0 |

FIG. 7

| Techniques | Matched Results | Modified Technique Weight | Degree-of-match Score | Modified Degree-of-match Score |
|---|---|---|---|---|
| Standard | What are your mortgage rates? | 5 | 1 | 1.25 |
| Cross-Context | What are your account interest rates? | 4 | 1 | 1.25 |
| | What are your account interest rates? | 4 | 1 | 1.25 |
| | What are your credit card rates? | 4 | 1 | 1.25 |
| | What are your credit card rates? | 4 | 1 | 1.25 |
| Previous Query (1) | How do variable interest rate mortgages work? | 4 | 3 | 3.5 |
| Previous Query (1) & Cross-Context | What are your account interest rates? | 2 | 1 | 0.75 |
| | What are your account interest rates? | 2 | 1 | 0.75 |
| | What are your credit card rates? | 2 | 1 | 0.75 |
| | What are your credit card rates? | 2 | 1 | 0.75 |

FIG. 10

| Techniques | Matched Results | Modified Technique Weight | Degree-of-match Score | Modified Degree-of-match Score |
|---|---|---|---|---|
| Standard | What are your mortgage rates? | 5 | 1 | 1.25 |
| Cross-Context | What are your account interest rates? | 4 | 1 | 1.25 |
| | What are your account interest rates? | 4 | 1 | 1.25 |
| | What are your credit card rates? | 4 | 1 | 1.25 |
| | What are your credit card rates? | 4 | 1 | 1.25 |
| Previous Query (1) | How do variable interest rate mortgages work? | 4 | 3 | 3.5 |
| Previous Query (1) & Cross-Context | What are your account interest rates? | 2 | 1 | 0.75 |
| | What are your account interest rates? | 2 | 1 | 0.75 |
| | What are your credit card rates? | 2 | 1 | 0.75 |
| | What are your credit card rates? | 2 | 1 | 0.75 |

FIG. 11

DISAMBIGUATION FRAMEWORK FOR INFORMATION SEARCHING

FIELD OF THE INVENTION

The present invention relates to searching for information, and more particularly to a method, software and device implementing a modular framework to search for information matched to potentially ambiguous queries.

BACKGROUND OF THE INVENTION

Internet users have grown increasingly reliant on searching tools to locate information online. Information providers interested in providing information to those users, e.g., government agencies, educational institutions, product manufacturers, online stores, banks, to name but a few, thus face the challenge of making their information easily accessible and searchable.

Some information providers rely primarily on third-party search services (often referred to as "search engines"), such as Google, Yahoo, and Bing. These third-party search services index information on web sites accessible through the public Internet, including information on web sites operated by information providers. These third-party search services allow Internet users to search within indexed information for desired content.

Other information providers use private indexing and searching tools to supplement or replace third-party search services. An information provider may, for example, use such tools to allow users to conduct a search that is confined to that information provider's web site. Similarly, the information provider may allow users to narrow the scope of a search to a particular portion of the web site, such as a particular database, e.g., a database devoted exclusively to technical support inquiries or billing inquiries. Such databases are commonly referred to as knowledgebases. These indexing and searching tools may be custom tailored to suit the particular characteristics of the information provider's information. Ultimately, these tools are intended to enable users to search with more efficiency and/or ease than is typically possible with a third-party search services.

One such private information indexing and searching tool is disclosed in U.S. Pat. No. 7,171,409 (hereinafter the '409 patent), the contents of which are hereby incorporated by reference. This patent discloses organizing information as a plurality of responses to possible queries. For each response, a Boolean expression that may be applied to possible queries is formulated and stored. When a query is received from a user, the stored Boolean expressions are applied to the query. Responses associated with the expressions that are satisfied by the query may be presented to the user.

One limitation of many searching tools, including the above-described third-party search services, is that they require users to formulate a query with a requisite degree of precision, e.g., by stringing together a sufficient number of search terms. However, users often formulate queries that are imprecise, incomplete or otherwise ambiguous. For example, a user using a searching tool on a banking web site may issue a query simply as "rates?" In this case, the user may have intended, for example, to search for information on interest rates for a savings account, interest rates on a credit card balance, or interest rates on a mortgage loan. The ideal searching tool should provide search results satisfying the user's information needs, notwithstanding potential ambiguity in the user's query.

A searching tool that does not try to address potential ambiguity in the user's query may fail to satisfy the user's information needs in different ways. For example, a searching tool may provide too many search results to the user, e.g., by providing search results for all types of interest rates to a user who is only interested in interest rates for mortgages loans. In this situation, the user may fail to locate the relevant information within the set of search results provided. A searching tool may provide insufficient search results if, due to ambiguity in the search query, matched results fall below a confidence threshold imposed by the search tool. A searching tool that simply guesses at user's information needs may provide only irrelevant information, e.g., by providing search results for interest rates for credit cards to the user who is only interested in interest rates for mortgage loans. In any event, the search tool fails to provide search results that satisfy the user's information needs.

Accordingly, there is a need for improved search methods, software and devices to detect when a user query is potentially ambiguous, and to provide search results matched to the user query, notwithstanding potential ambiguity in that user query.

SUMMARY OF THE INVENTION

In accordance with an aspect of the present invention, there is provided a computer-implemented method of responding to a user query. The method comprises receiving the user query from a user, matching the user query to stored responses to obtain an initial set of matched responses, and calculating a confidence metric indicating the likelihood of the initial set of matched responses satisfying the user query. The method also comprises, upon determining the confidence metric to be below a specified threshold, supplementing the user query with a plurality of contextual data, further matching the user query, supplemented by the plurality of contextual data, to stored responses by applying a plurality of disparate matching techniques to obtain a further set of matched responses, where at least one of the plurality of disparate matching techniques differs from techniques used to obtain the initial set of matched responses, for each matched response in the further set of matched responses, calculating a degree-of-match metric indicating a quality of match between that matched response and the user query, where the calculating takes into account the plurality of contextual data, and presenting at least one matched response of the initial set of matched responses and the further set of matched responses to the user.

In accordance with another aspect of the present invention, there is provided a computer-readable medium storing instructions. The instructions, when executed, adapt a computing device to receive a user query from a user, to match the user query to stored responses to form an initial set of matched responses, and to calculate a confidence metric indicating a likelihood of the initial set of matched responses satisfying the user query. The instructions when executed, also adapt the computing device, upon determining the confidence metric to be below a specified threshold, to supplement the user query with a plurality of contextual data, to further match the user query, supplemented by the plurality of contextual data, to stored responses by applying a plurality of disparate matching techniques to obtain a further set of matched responses, where at least one of the plurality of disparate matching techniques differs from techniques used to obtain the initial set of matched responses, and for each matched response in the further set of matched responses, to calculate a degree-of-match metric, taking into account the plurality of contextual data, the degree-of-match metric indicating a quality of match between that matched response and the user query, and to present at least one matched response of the initial set of matched responses and the further set of matched responses to the user.

In accordance with yet another aspect of the present invention there is provided a computing device for responding to a user query. The computing device comprises at least one processor, memory in communication with the at least one processor, and software code stored in the memory, executable on the at least one processor. The software code comprises an initial search module, an ambiguity detection module, a query supplementation module, and a supplemented search module. The initial search module is for receiving a user query from a user, and matching the user query to stored responses to form an initial set of matched responses. The ambiguity detection module is for calculating a confidence metric indicating a likelihood of the initial set of matched responses satisfying the user query, and detecting ambiguity in the initial set of matched responses when the confidence metric is below a predetermined threshold. The query supplementation module is for, when ambiguity is detected, supplementing the user query with a plurality of contextual data. The supplemented search module is for, when ambiguity is detected, further matching the user query, supplemented by the plurality of contextual data, to stored responses by applying a plurality of disparate matching techniques to obtain a further set of matched responses, where at least one of the plurality of disparate matching techniques differs from techniques used to obtain the initial set of matched responses, and for each matched response in the further set of matched responses, calculating a degree-of-match metric indicating a quality of match between that matched response and the user query, where the calculating takes into account the plurality of contextual data, and presenting at least one matched response of the initial set of matched responses and the further set of matched responses to the user.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures, which illustrate by way of example only, embodiments of this invention:

FIG. 5 is a table showing the state-to-technique matrix used by the search software of FIG. 3.

FIG. 7 is a table showing the calculation of modified technique weights using the state-to-technique matrix of FIG. 5 for a query state corresponding to an example user query.

FIG. 10 is a table showing the search results of FIG. 9 collated, and their respective modified degree-of-match scores.

FIG. 11 is a table showing the search results of FIG. 10 filtered to eliminate duplicate search results, and showing the search result presented to the user.

DETAILED DESCRIPTION

Figure 1:
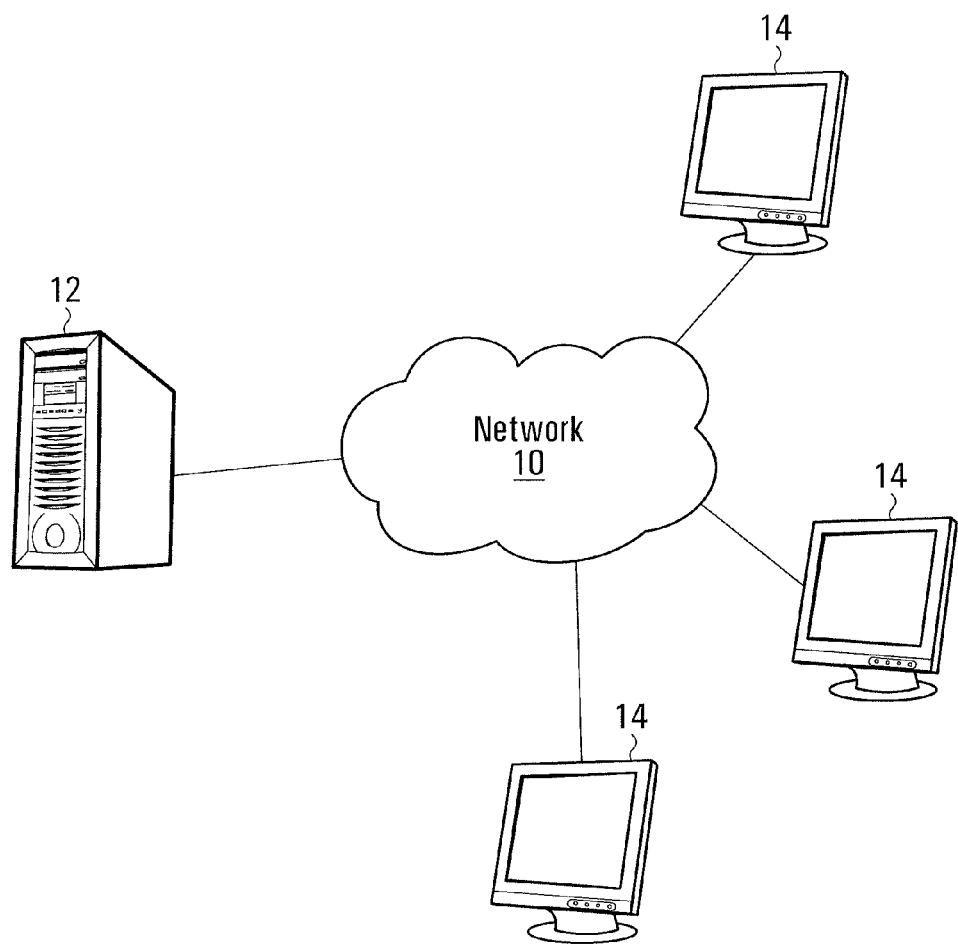
FIG. 1 is a network diagram illustrating a computer network, a server and end-user devices interconnected to the network, exemplary of an embodiment of the present invention.

FIG. 1 illustrates a computer network and network interconnected server 12, exemplary of the present invention. As will become apparent, server 12 is a computing device that includes software that implements a disambiguation framework for searching for information. This software adapts server 12 to search for information in response to queries received from users of server 12, and to present search results to those users, in manners exemplary of embodiments of the present invention.

As illustrated, server 12 is in communication with other computing devices such as end-user computing devices 14 through computer network 10. Network 10 may be the public Internet, but could similarly be a private local area packet switched data network coupled to server 12. So, network 10 could, for example, be an IPv4, IPv6, X.25, IPX compliant or similar network. Network 10 may include wired and wireless points of access, including wireless access points, and bridges to other communications networks, such as GSM/GPRS/3G or similar wireless networks.

Example end-user computing devices 14 are illustrated. End-user computing devices 14 are conventional network-interconnected computing devices used to access data and services through a suitable HTML browser or similar interface from network interconnected servers, such as server 12. Each computing device 14 is typically provided by a user of server 12 and not by the operator of server 12. The architecture of computing devices 14 is not specifically illustrated. Each computing device 14 may include a processor, network interface, display, and memory, and may be a desktop personal computer, a laptop computing device, a network computing device, a tablet computing device, a personal digital assistance, a mobile phone, or the like. Computing devices 14 may access server 12 by way of network 10. As such, computing devices 14 typically store and execute network-aware operating systems including protocol stacks, such as a TCP/IP stack, and web browsers such as Microsoft Internet Explorer, Mozilla Firefox, Google Chrome, Apple Safari, or the like.

Figure 2:
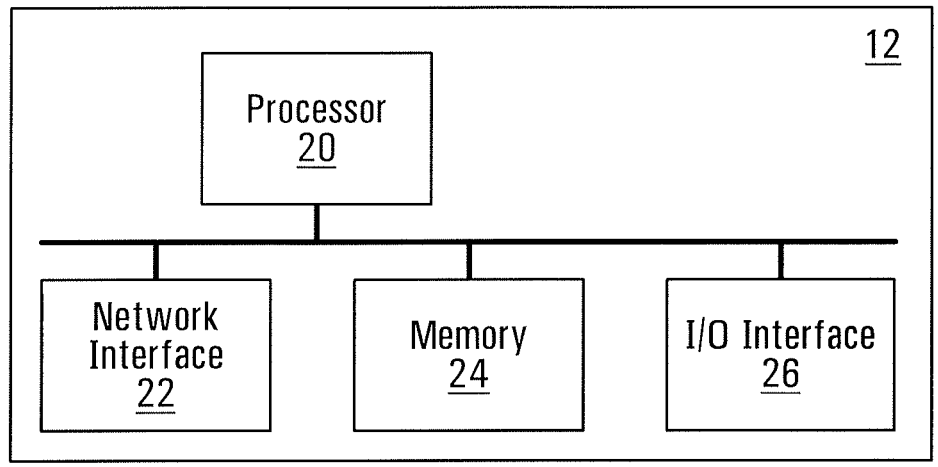
FIG. 2 is a high level block diagram of a computing device for use as the server of FIG. 1.

FIG. 2 is a high-level block diagram of a computing device that may act as server 12. As illustrated, server 12 includes processor 20, network interface 22, a suitable combination of persistent storage memory 24, random access memory and read only memory, one or more I/O interfaces 26. Processor 20 may be an Intel x86, PowerPC, ARM processor or the like. Network interface 22 interconnects server 12 to network 10. Memory 24 may be organized using a conventional filesystem, controlled and administered by an operating system governing overall operation of server 12. Server 12 may store in memory 24, through this filesystem, information to be searched, past queries received from users, and hypertext transfer protocol ("HTTP") files to provide users an interface to issue queries. Server 12 may include input and output peripherals interconnected to server 12 by one or more I/O interfaces 26. These peripherals may include a keyboard, display and mouse. These peripherals may also include devices usable to load software components exemplary of embodiments of the present invention into memory 24 from a computer readable medium. Server 12 executes these software components to adapt it to operate in manners exemplary of embodiments of the present invention, as detailed below.

Figure 3:
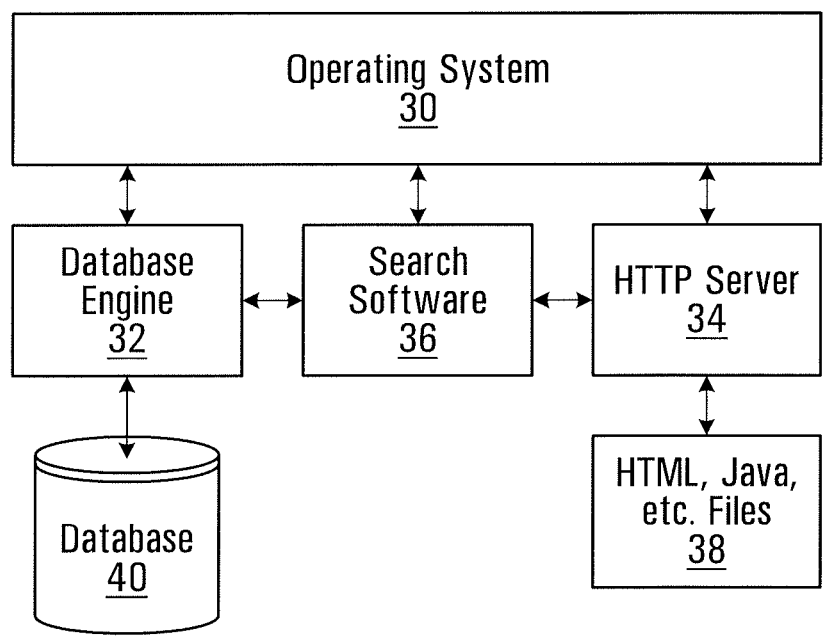
FIG. 3 illustrates the software organization of the server of FIG. 1.

FIG. 3 illustrates a simplified organization of example software components stored within persistent storage memory 24 of server 12 as depicted in FIG. 3. As illustrated, software components includes operating system (O/S) software 30, a database engine 32, database 40, an HTTP server application 34, and search software 36, exemplary of embodiments of the present invention. Database 40 may be stored in memory 24 of server 12. Also illustrated are data files 38 used by search software 36 and HTTP server application 34.

O/S software 30 may, for example, be a Unix-based operating system (e.g., Linux, FreeBSD, Solaris, OSX, etc.), a Microsoft Windows operating system or the like. O/S software 30 allows search software 36 to access processor 20, network interface 22, memory 24, and one or more I/O interfaces 26 of server 12. O/S system software 30 may include a TCP/IP stack allowing server 12 to communicate with interconnected computing devices, such as computing devices 14, through network interface 22 using the TCP/IP protocol.

Database engine 32 may be a conventional relational or object-oriented database engine, such as Microsoft SQL Server, Oracle, DB2, Sybase, Pervasive or any other database engine known to those of ordinary skill in the art. Database engine 32 provides access to one or more databases 40, and thus typically includes an interface for interaction with O/S software 30, and other software, such as search software 36. Database 40 may be a relational or object-oriented database. As will become apparent, database 40 stores information to be searched. Database 40 may also store past queries received from users.

HTTP server application 56 is a conventional HTTP web server application such as the Apache HTTP Server, nginx, Microsoft IIS, or similar server application. HTTP server application 56 allows server 26 to act as a conventional HTTP server and provides a plurality of HTTP pages of a web site, stored for example as (X)HTML or similar code, for access by interconnected computing devices such as computing devices 14. These pages may be stored within files 38.

Search software 36 adapts server 12, in combination with O/S software 30, database engine 32, and HTTP server application 34, to function in manners exemplary of embodiments of the present invention. Search software 36 may act as an interface between database engine 32 and HTTP server application 34 and may process queries issued by users operating computing devices 14. In this way, search software 36 may search for information stored in database 40 in response to queries received from users interacting with HTTP pages of a web site, presented to computing devices 14 by HTTP server application 34. Similarly, search software 36 may present users with information matched to those user queries by way of HTTP pages.

HTTP pages provided to computing devices 14 in communication with server 12 typically provide users at devices 12 with access to a search tool and interface for searching information in database 30. The interface may be stored as (X)HTML, Java, Javascript, Ruby, Python, Perl, PHP, Flash or the like in files 38. Conveniently, users searching for information may form and issue queries by clicking on icons and hyperlinks, and by entering data into information fields of the HTTP pages, presented at computing devices 14. Users may also interact with this interface to select one or more contexts in which to conduct their searches, as detailed below. As such, HTTP pages are typically designed and programmed by or on behalf of the operator or administrator of server 12. Conveniently, the HTTP pages may be customized and varied, as a server, such as server 12, may be used by various information or index providers.

Each user query is formed and issued as part of a search session. A session may, for example, be initiated when a user visits an HTTP page provided by server 12 by way of HTTP server application 34, or when a user logs in at server 12. A session may encompass a single visit by a user to HTTP pages provided by server 12. A session may also be preserved over multiple visits, for example, through the use of browser cookies stored at computing devices 14 and/or session data stored at server 12.

As noted above, users may select one or more contexts in which to conduct their searches. A context refers to collection of information organized by a theme or topic. For example, a bank may organize information related to interest rates into multiple contexts: mortgage loans, credit cards, savings accounts, etc. Similarly, a manufacturer may organize information into contexts based on product model.

A context may be associated with one or more other related contexts. For example, a bank may associate a savings accounts context with a chequing account context, based on the assumption that these two contexts contain related information such that a user interested in information on savings accounts may also be interested in information on chequing accounts.

Information organized into contexts may be stored in one or more databases 40. A person of ordinary skill in the art will readily appreciate that each context may be stored in one or more logical or physical databases. Conversely, each logical or physical database may store information from multiple contexts. The organization of contexts into one or more databases 40 may vary between embodiments. The terms "context" and "database" will be used interchangeably in the description below.

After a user has formed and issued a query, this query is provided to search software 36 to search for information matched to the query, in manners exemplary of embodiments of the present invention. When the user has selected one or more contexts, indicators of these selected contexts are also provided to search software 36. When the user has not selected any contexts, contexts pre-selected by the operator or administrator of server 12 may be provided to search software 36.

Figure 4:
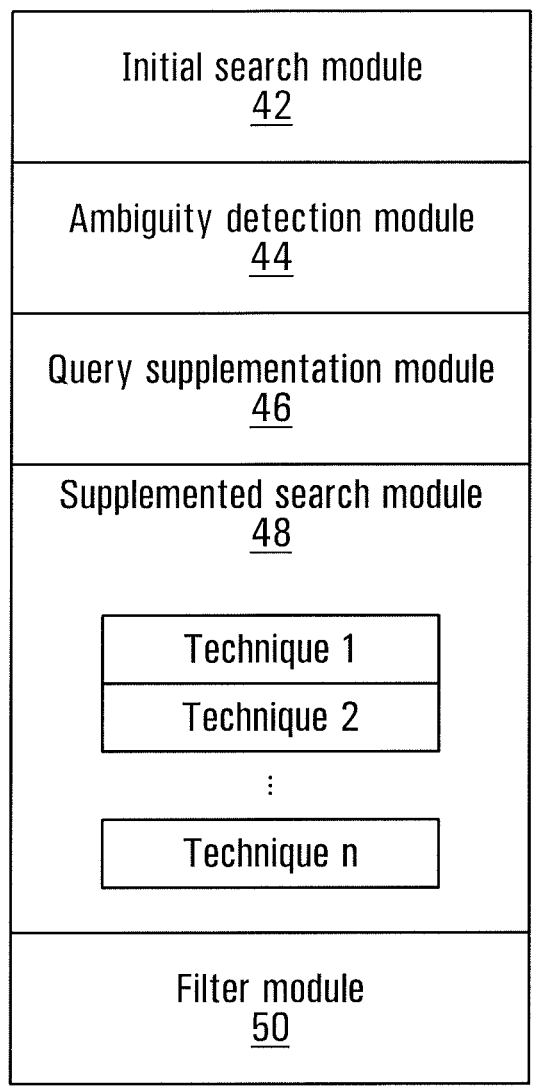
FIG. 4 is a high level block diagram of the modules of the search software of FIG. 3 executing at the server of FIG. 1.
Figure 6:
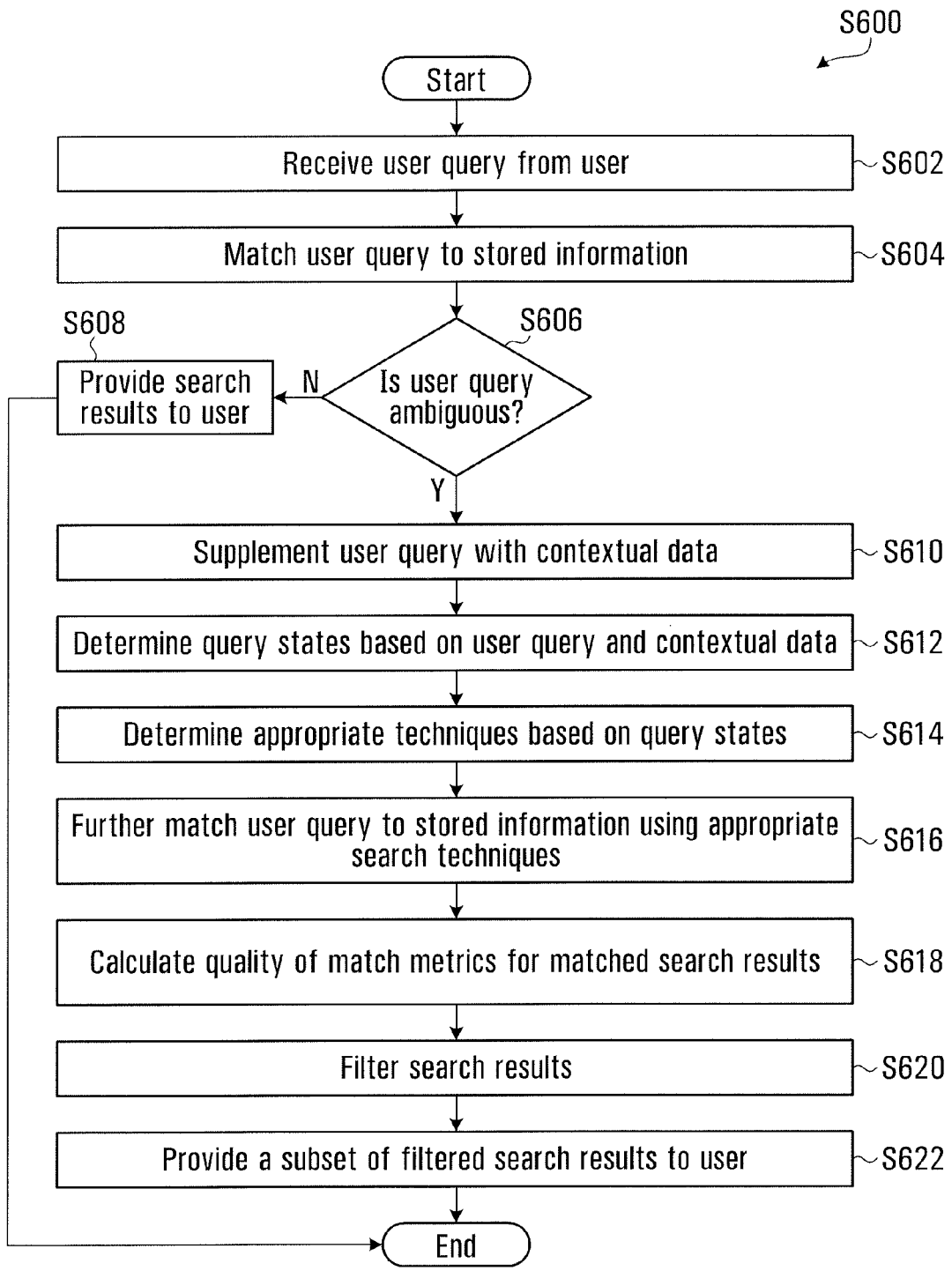
FIG. 6 is a flow chart illustrating exemplary blocks performed by the search software of FIG. 3.

In the embodiment depicted in FIG. 4, search software 36 includes initial search module 42, ambiguity detection module 44, query supplementation module 46, supplemented search module 48 and filter module 50. As depicted, supplemented search module 46 includes n submodules, respectively implementing n matching techniques. These modules and submodules may be written using conventional computing languages such as C, C++, C#, Perl, Java, Visual Basic or the like. These modules and submodules may be in the form of executable applications, scripts, or statically or dynamically linkable libraries. Some of these modules and submodules, such as, for example, initial search module 42 or matching technique submodules of supplemented search module 46, may be provided by third-party developers.

Initial search module 42 receives a user query, and searches for information matched to that user query among information stored in database 40. Initial search module 42 may also receive an indicator of one or more selected contexts. As noted above, contexts may be selected by the user or be pre-defined. When such an indicator is received by initial search module 42, searching may be confined to the indicated contexts, or contexts related to the indicated contexts. Initial search module 42 may implement one or more conventional matching techniques. Initial search module 42 may, for example, implement the matching techniques disclosed in the '409 patent.

Upon searching, initial search module 42 produces an initial set of search results matched to the user query. Initial search module 42 may fail to match any search results. Thus, this initial set of search results may contain no search results, i.e., this initial set may be empty. For each search result of the set of search results, if any, initial search module 42 may calculate an associated degree-of-match score to indicate the estimated quality of match between that particular search result and the user query. The degree-of-match score may be calculated, for example, using the scoring algorithm disclosed in the '409 patent.

Ambiguity detection module 44 analyzes this initial set of search results to determine if the user query is likely ambiguous. This determination may rely on one or more heuristics to calculate a confidence score to indicate the likelihood that the initial set of search results satisfies the user query. A user query is determined to be likely ambiguous if this confidence score does not meet, e.g., falls below a pre-defined threshold. For example, this confidence metric may be calculated from the number of search results. In this case, a user query may be determined to be likely ambiguous if there are too many search results, which may indicate that the search has been conducted too broadly. A user query may also be determined to be likely ambiguous if there are too few search results, which may indicate that ambiguity in the user query caused an insufficient number of search results to be provided by initial search module 42.

The confidence score may also be calculated from other metrics. For example, a user query may be determined to be likely ambiguous if the degree-of-match scores associated with the search result of the set of search results fail to satisfy pre-defined criteria. A user query may also be determined to be likely ambiguous if the set of search results contains search results matched from more than one context.

Other heuristics will be readily apparent to persons of ordinary skill in the art, and in other embodiments of the present invention these heuristics may be used in place of or in combination with the above-described heuristics.

If ambiguity detection module 44 determines that a user query is not likely ambiguous, at least one search result of the initial set of search results is presented to the user. For example, search results may be ranked according to their calculated degree-of-match scores, and upon ranking, one or more of the highest ranking search results may be presented to the user. Search software 36 then ceases to process the user query.

However, if ambiguity detection module 44 determines that the user query is likely ambiguous, then additional modules of search software 36 are invoked to further search for results matched to the user query. As detailed below, search results obtained by this further searching may better satisfy the user's information needs than those in the initial set of search results. Alternatively, this further searching may establish that search results in the initial set of search results better satisfy the user's information needs than search results obtained by further searching, notwithstanding potential ambiguity in the user query.

Conveniently, search software 36 may be configured to invoke these further modules without requiring any additional input from the user. Therefore, the user need not be notified that the user query has been determined to be likely ambiguous, or that further searching will be performed. In other embodiments, search software 36 may be configured to prompt the user for permission or additional input before performing further searching.

If ambiguity detection module 44 determines that a user query is likely ambiguous, query supplementation module 46 is invoked. Query supplementation module 46 supplements the user query with contextual information relevant to the user query and the initial set of search results. This contextual information may include previous queries issued by the user, when previous queries have been issued and stored. These previous queries may include queries received from the user during the current search session or those received during previous search sessions. Previous queries may be stored at server 12 in database 40. Previous queries may also be stored at computing devices 14 operated by users, for example, in the form of browser cookies.

As detailed below, this contextual information may also include characteristics of the user query such as, for example, whether a context was selected, and the number of words in the query. This contextual information may also include characteristics of the initial set of search results, such as, for example, the number of search results in the set. This contextual information may also include the characteristics of the contexts stored in database 40, such as, for example, the number of available contexts.

This contextual information is represented by a set of Boolean state variables, hereinafter referred to as the query state vector. These Boolean state variables include the exemplary state variables listed below in Table I. A Boolean state variable is set to true if the associated condition listed in Table I is met, and set to false otherwise. The state variables listed in Table I are exemplary only and additional relevant states will be readily apparent to persons of ordinary skill in the art. In other embodiments of the present invention, other state variables may used. State variables may be added to or removed from the query state vector, as desired.

TABLE I

Exemplary State Variables

| State Variable | Condition |
| --- | --- |
| No answer | Initial set of search results contains no responses |
| 1 answer | Initial set of search results contains one response |
| 2+ answers | Initial set of search results contains more than two responses |
| Vague query | User query is short, e.g., contains less than four words |
| Specific query | User query is long, e.g., contains more than four words |
| Asked in context | A context/database was selected for the user query |
| Asked out of context | A context/database was not selected for the user query |
| Multiple contexts | Multiple contexts/databases are available |
| Single context | Only a single context/database is available |

TABLE I-continued

Exemplary State Variables

| State Variable | Condition |
|---|---|
| 2+ query session | User query is part a session having more than two total queries |
| 2 query session | User query is part a session having two total queries |
| 1 query session | User query is the only query in a session |

The current query, previous queries, and the query state vector are provided to supplemented search module 48. As depicted in FIG. 4, supplemented search module 48 includes n submodules, respectively implementing one of n matching techniques. Each of the matching technique submodules provides search results matched to a user query supplemented by contextual information, e.g., previous queries and the query state vector. Each of the matching technique submodules is unique, and may differ from other submodules by the algorithm used to perform the matching, the input provided to the searching algorithm, and/or the contexts in which the search is conducted. Matching techniques varying in these and other aspects will be readily apparent to persons of ordinary skill in the art.

Each of the matching techniques may be entirely conventional, and may include, for example, the matching techniques disclosed in the '409 patent. As the matching techniques implemented by the n submodules of supplemented search module 48 may be conventional, the implementations of these matching techniques are not detailed herein, and each matching technique is described with reference only to its inputs, i.e., the search terms, and the contexts in which searching is conducted. Submodules implementing various matching techniques may be added or removed, enabled or disabled, by the operator or administrator of server 12.

Implementation of search software 36 according to the modular framework described herein does not require any particular submodules to be used, or a particular number of submodules to be used. Thus, the combination of submodules and the number of submodules (n) may vary from embodiment to embodiment, from implementation to implementation, and from time to time.

During further searching performed by the submodules of supplemented search module 48, it may be desirable to obtain at least some search results that differ from those in the initial set of search results. Accordingly, in some embodiments, at least one of the matching techniques implemented in the submodules of supplemented search module 48 differs from the technique or techniques used by initial search module 42 to obtain the initial set of search results. In some embodiments, each of the matching techniques implemented in the submodules of supplemented search module 48 differs from the technique or techniques used by initial search module 42 to obtain the initial set of search results. The number of matching techniques implemented in the submodules of supplemented search module 48 may be greater than the number of techniques used to obtain the initial set of search results.

During further searching performed by supplemented search module 48, it may also be desirable to obtain search results that include search results in the initial set of search results. This allows, for example, those search results in the initial set of search results to be readily ranked against search results obtained only by further searching. Such ranking may establish that one or more search results in the initial set of search results better satisfies the user's information needs than any search results obtained only by further searching, notwithstanding potential ambiguity in the user's query. Accordingly, in some embodiments, one or more of the submodules of supplemented search module 48 may replicate the technique or techniques used by initial search module 42, to ensure that search results in the initial set of search results are also obtained by supplemented search module 48. Of course, it will be appreciated that different techniques, though varying in their inputs and/or algorithms, may nonetheless match the user's query to the same search results. Therefore, even in embodiments where no submodules of supplemented search module 48 replicate the technique or techniques used by initial search module 42, search results obtained by further searching may overlap with search results in the initial set of search results.

As each matching technique is unique, some matching techniques may be more appropriate, e.g., more likely to provide a search result satisfying the user's informational needs, than other matching techniques for any given input and/or any given context. For example, when a previous query has been issued and stored, a matching technique that searches for terms from the current query supplemented by terms from the previous query may be more appropriate than a matching technique that does not search on previous queries. Conversely, a matching technique that relies on a previous query is inappropriate when a previous query is not available. Therefore, in some embodiments, a set of submodules implementing disparate matching techniques is selected to collectively suit a wide variety of possible inputs and available contexts.

Each matching technique may be assigned a default technique weight that indicates the expected likelihood that the matching technique will provide a search result that satisfies the user query. This likelihood may be estimated from historical performance of the matching technique in providing search results satisfying user queries. Default technique weights are typically assigned by the operator or administrator of server 12.

Supplemented search module 48 includes submodules implementing the exemplary matching techniques described below in Table II. Each of these matching techniques has been assigned a default technique weight between 1 and 5, with a higher number indicating that the technique is more likely to provide a search result that satisfies the user query. These matching techniques are exemplary only. In other embodiments of the present invention, submodules implementing other matching techniques known to persons of ordinary skill in the art may be used.

TABLE II

Exemplary Matching Techniques

| Technique | Description | Default Technique Weight |
|---|---|---|
| Standard | Match the user query to stored information in the selected context | 5 |
| Cross-Context | Match the user query to stored information in contexts other than the selected context | 4 |
| Previous Query (1) | Form new query including terms from the current query and the previous query, and match the new query to stored information in the selected context | 3 |

TABLE II-continued

Exemplary Matching Techniques

| Technique | Description | Default Technique Weight |
|---|---|---|
| Previous Query (2) | Form a new query including terms from the current query and the query prior to previous query, and match the new query to stored information in the selected context | 2 |

Matching techniques may be combined to create additional techniques. For example, two matching techniques are combined serially by using a first matching technique to search within one or more contexts to produce an interim set of search results, and then using a second matching technique to search only within this interim set of search results to produce a second set of search results. This second set of search results is then taken as the output for the combined techniques. This method of combining matching techniques serially may also be extended to combine more than two matching techniques.

Matching techniques may also be combined in a manner that only includes part of one or both of the matching techniques. For example, the Previous Query (1) technique may be combined with the Cross-Context technique. In this combination, in accordance with the Previous Query (1) technique, a new query is formed including terms from the current query and previous query. Then, this new query is searched in accordance with the Cross-Context method, i.e., by matching the new query to stored information in contexts other than the selected context.

The collection of disparate matching techniques in supplemented search module 48 additionally includes the combined matching techniques described below in Table III. Other combinations of matching techniques will be readily apparent to persons of ordinary skill in the art, and may be included in other embodiments of the present invention.

TABLE III

Exemplary Combined Matching Techniques

| Combined Technique | Description | Default Technique Weight |
|---|---|---|
| Previous Query (1) & Cross-Context | Form new query including terms from the current query and the previous query, and match the new query to stored information in contexts other than the selected context | 2 |
| Previous Query (2) & Cross-Context | Form a new query including terms from the current query and the query prior to previous query, and match the new query to stored information in contexts other than the selected context | 1 |

As noted above, the appropriateness of any particular matching technique may vary with the provided input and the available contexts. Therefore, supplemented search module 48 analyzes the Binary state variables of the query state vector, and modifies the default technique weights assigned to the matching techniques based on this analysis. Whereas a default technique weight indicates the expected likelihood that an associated matching technique will provide a search result that satisfies the user query, a modified technique weight indicate the expected likelihood that the matching technique will provide a search result that satisfies the user query for a given query state vector.

Supplemented search module 48 modifies the default technique weights using the state-to-technique matrix illustrated in FIG. 5. Each column of the state-to-technique matrix corresponds to a Binary state variable of the query state vector, while each row of this matrix corresponds to a matching technique implemented by a submodule of supplemented search module 48. Therefore, each cell of the state-to-technique matrix corresponds to a particular state and matching technique pair. Each cell of the state-to-technique matrix may contain a technique weight modification factor. These modification factors are typically assigned by the operator and administrator of server 12.

For each cell, if the particular state associated with the cell is true, the technique value for the particular matching technique associated with the cell is modified by the modification factor contained in that cell. If no modification factor is contained in a cell, i.e., the cell is blank, then the technique value is not modified. The state-to-technique matrix depicted in FIG. 5 includes three different modification factors: "+1", "−1" and "×0". In other embodiments, other factors may also be used.

For example, the "Standard" matching technique, represented by the first row of the matrix, has a default technique value of 5 (Table II). However, if the "Asked out of context" state is true, e.g., indicating that a context/database was not selected, then the technique value is modified by a multiplicative factor of "×0". The modified technique value is thus 0, indicating that the "Standard" technique is not appropriate for the given query state.

A default technique value may be modified by several modification factors. For example, the "Previous Query (1)" technique, represented by the third row of the matrix, has a default technique value of 3 (Table II). If the "2+ answer" and "Specific query" states are both true and all other states are false, then the applicable modification factors are the two subtractive factors "−1" and "−1". In this case, the default technique value of 3 is reduced to 1. When the multiplicative factor of "×0" is present, it is applied after additive/subtractive factors, i.e., the modified technique value is always 0 when a "×0" modification factor applies.

After the modified technique values are calculated for each of the matching techniques, some of matching techniques may have modified technique values of 0 or lower. A modified technique value of 1 or higher indicates that the matching technique is appropriate for the given query state, while a modified technique value of 0 or lower indicates that the matching technique is inappropriate for the given query state. Submodules implementing matching techniques found to be inappropriate are disabled for the current user query.

Supplemented search module 48 uses each of the submodules determined to be appropriate, i.e., those submodules that have not been disabled, to search for information matched to the supplemented user query. Upon searching, each of these submodules provides a set of search results. When a matching technique submodule fails to match the supplemented user query to any search results, the set of search results provided by that submodule may be empty. For each search result, the submodule providing that search result also calculates an associated degree-of-match score to indicate the quality of match between that particular search result and the supplemented user query. The degree-ofmatch score may be calculated, for example, using the scoring algorithm disclosed in the '409 patent.

Supplemented search module 48 modifies the degree-of-match scores provided by the matching technique submodules using the modified technique weights. Each degree-of-match score may be modified according to the following formula:

$$mScore = \frac{score + tv}{\max(1, 5 - score)}$$

where the variable score represents the degree-of-match score, the variable tv represents the modified technique value, and the variable mScore represents the modified degree-of-match score. The degree-of-match scores may also be modified in other ways and using other formulas apparent to persons of ordinary skill in the art, for example, by taking into account weights assigned to contexts, additional information regarding the particular user or the search session, etc. The calculated degree-of-match scores facilitate ranking of search results, as detailed below.

Supplemented search module 48 combines the search results and their associated degree-of-match scores from its submodules to form a single set of search results and scores. This set of search results and their associated modified degree-of-match scores are provided to filter module 50.

As noted above, one or more search results included in the initial set of search results may better satisfy the user's information needs than any search results obtained only by further searching, notwithstanding potential ambiguity in the user's query. In some embodiments, to facilitate ranking of search results in the initial set of search results against search results obtained only by further searching, supplemented search module 48 may include one or more submodules replicating the techniques or techniques used by initial search module 42. This ensures that the single set of search results formed by supplemented search module 48 includes those search results in the initial set of search results. This also ensures that modified degree-of-match scores are calculated by supplemented search module 48 for those search results.

In other embodiments, to facilitate ranking of search results in the initial set of search results against search results obtained only by further searching, the initial set of search results may be separately provided by initial search module 42 to filter module 50. In such embodiments, each degree-of-match scores associated with a search result, as calculated by initial search module 42 and detailed above, is modified using the formula for calculating a modified degree-of-match score (mScore). In calculating the mScore value for search results in the initial set of search results, the variable score is assigned a value equal to the degree-of-match score to be modified, and the variable tv is assigned a value of 5. Modified degree-of-match scores are provided by initial search module 42 to filter module 50.

Filter module 50 filters search results received from supplemented search module 48, and in some embodiments, also search results received from initial search module 42, before any search results are presented to the user. Filter module 50 combines received search results into a single set of search results for filtering according to the techniques detailed below.

Filter module 50 may implement one or more filtering techniques. Each filtering technique takes a set of search results and eliminates certain of those search results based on pre-defined criteria. Multiple filtering techniques may be applied sequentially to a set of search results, with each successive filtering technique operating on the filtered result produced by the preceding filtering technique. Filter module 50 includes a filter technique that eliminates search results that are duplicated in the set of search results, and/or to eliminate search results that have already been presented to the user in the current search session. If the same search result is provided by multiple matching techniques, then only the search result from those duplicated search results having the highest modified degree-of-match score is retained.

In other embodiments, filter module 50 may include a filtering technique that eliminates search results having a modified degree-of-match score below a pre-defined threshold.

After filtering by filter module 50, at least one search result in the filtered set of search results is presented to the user. For example, the set of filtered search results may be ranked according to their modified degree-of-match scores, and upon ranking, the highest ranking search results may be presented to the user.

Implementation of search software 36 according to the modular framework described herein does not require particular filtering techniques or a particular number of filtering techniques to be used in filter module 50. Like the matching techniques of supplemented search module 48, the filtering techniques of filter module 50 may vary. Filtering techniques may be added or removed, enabled or disabled, and ordered in sequence by the operator or administrator of server 12.

The operation of search software 36 is further described with reference to an example query session. In this example, the user interacts with HTTP pages on a web site provided by server 12 to form and issue the query "rates?" and to select the context "Mortgages." To provide search results in response to this user query, search software 36 performs blocks S600 and onward at server 12.

At block S602, search software 36 receives the user query and the selected context. At block S604, initial search module 42 searches within database 40 for information matched to the user query. In response to the query "rates?", initial search module 42 provides an initial set of search results including only one result: the stored query "What are your mortgage rates?" and the stored response for this query.

Next, at block S606, ambiguity detection module 44 analyzes the initial set of search results provided by initial search module 42 to determine if the user query is likely ambiguous. In this example, as the initial set of search results includes only a single search result, ambiguity detection module 44 determines that the user query is likely ambiguous. Execution of search software 36 therefore proceeds to block S610. If, however, ambiguity detection module 44 had determined that the user query is likely not ambiguous, then execution of search software 36 would have proceeded to block S608, at which point, the initial set of search results would have been presented to the user.

At block S610, query supplementation module 46 of search software 36 supplements the user query with contextual information. In this example, the relevant contextual information includes the one previous query in query session: "variable interest?" The relevant contextual information also includes the number of queries in the session, namely, two, the number of contexts available, namely, three (Mortgages, Savings, Credit Cards), the number of results in the initial set of search results, namely, one, and the number of words in the query, namely, one. At block S612, query supplementation module 46 calculates the Boolean state variables of the query state vector, as described in Table I. For the query and contextual information in this example, the values of the state variables of the query state vector are as follows (true states are shown with emphasis):

| | |
|---|---|
| No answer = | False |
| 1 answer = | True |
| 2+ answers = | False |
| Vague query = | True |
| Specific query = | False |
| Asked in context = | False |
| Asked out of context = | True |
| Multiple contexts = | True |
| Single context = | False |
| 2+ query session = | False |
| 2 query session = | True |
| 1 query session = | False |

Supplemented search module 48 is next executed. As noted, supplemented search module 48 includes the matching technique submodules described in Tables II and III. These technique submodules are assigned the default technique weights listed in Tables II and III. At block S614, supplemented search module 48 modifies these default technique weights using the query state vector and the state-to-technique matrix illustrated in FIG. 5. FIG. 7 depicts this state-to-technique matrix with those columns corresponding to true states highlighted using hatched lines. Specifically, as depicted, the columns corresponding to states "1 answer", "Vague query", "Asked in context, "Multiple contexts" and "2 query session" are highlighted. Within these highlighted columns of FIG. 7, four cells containing modification factors are further highlighted in bold. As depicted, a modification factor "+1" applies to the Previous Query (1) technique; two modification factors, "+1" and "×0", apply to the Previous Query (2) technique; and a modification factor "×0" applies to the Previous Query (2) & Cross-Context technique. For the Previous Query (1) technique, the modified technique weight is 3+1, namely 4. For the Previous Query (2) technique, the modified technique weight is (2+1)×0, namely 0. For the Previous Query (2) & Cross-Context technique, the modified technique is (1−1)×0, namely, 0. As noted above, whenever the "×0" modification factors applies, the resulting modified technique weight is always 0, regardless of what other factors might also apply.

Figure 8:
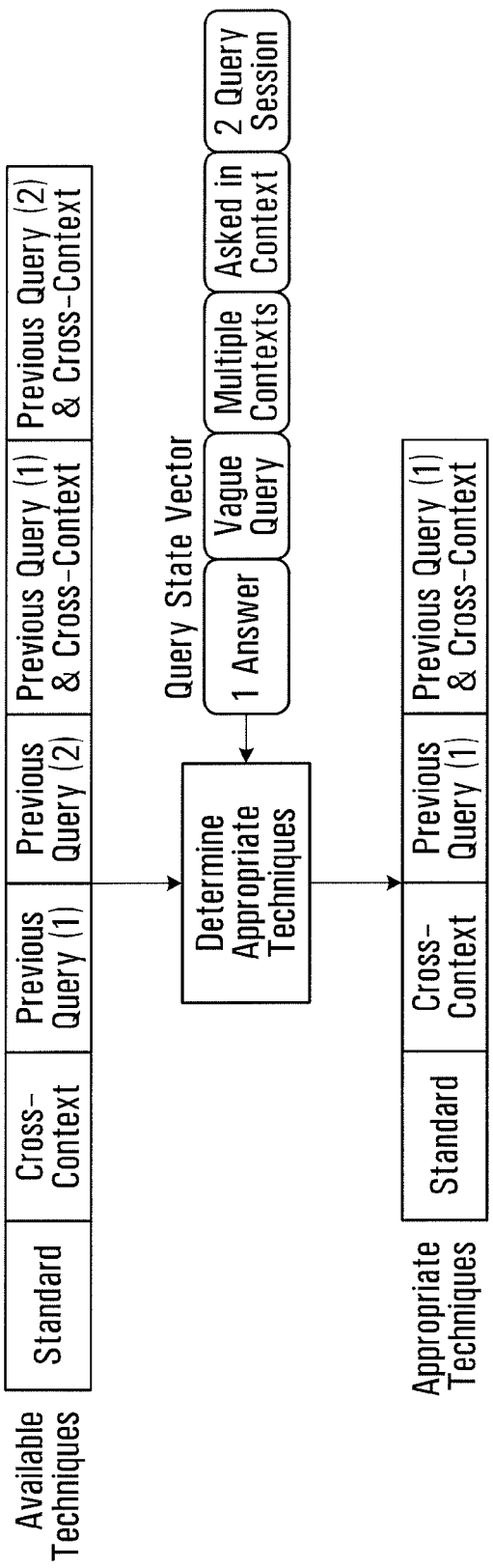
FIG. 8 illustrates determining appropriate matching techniques from available matching techniques for the example query state of FIG. 7.

Next, supplemented search module 48 analyzes the modified technique weights to determine which of the available matching techniques are appropriate for the given query state, as illustrated in FIG. 8. As illustrated in FIG. 7, two matching techniques, namely, Previous Query (2) and Previous Query (2) & Cross-Context have modified technique weights of 0, indicating that these techniques are not appropriate for the current query state. The submodules implementing these two matching techniques are thus disabled for the current user query. As illustrated in FIG. 8, the remaining four matching techniques, determined to be appropriate for the current query state, are Standard, Cross-Context, Previous Query (1), and Previous Query (1) & Cross Context.

Figure 9:
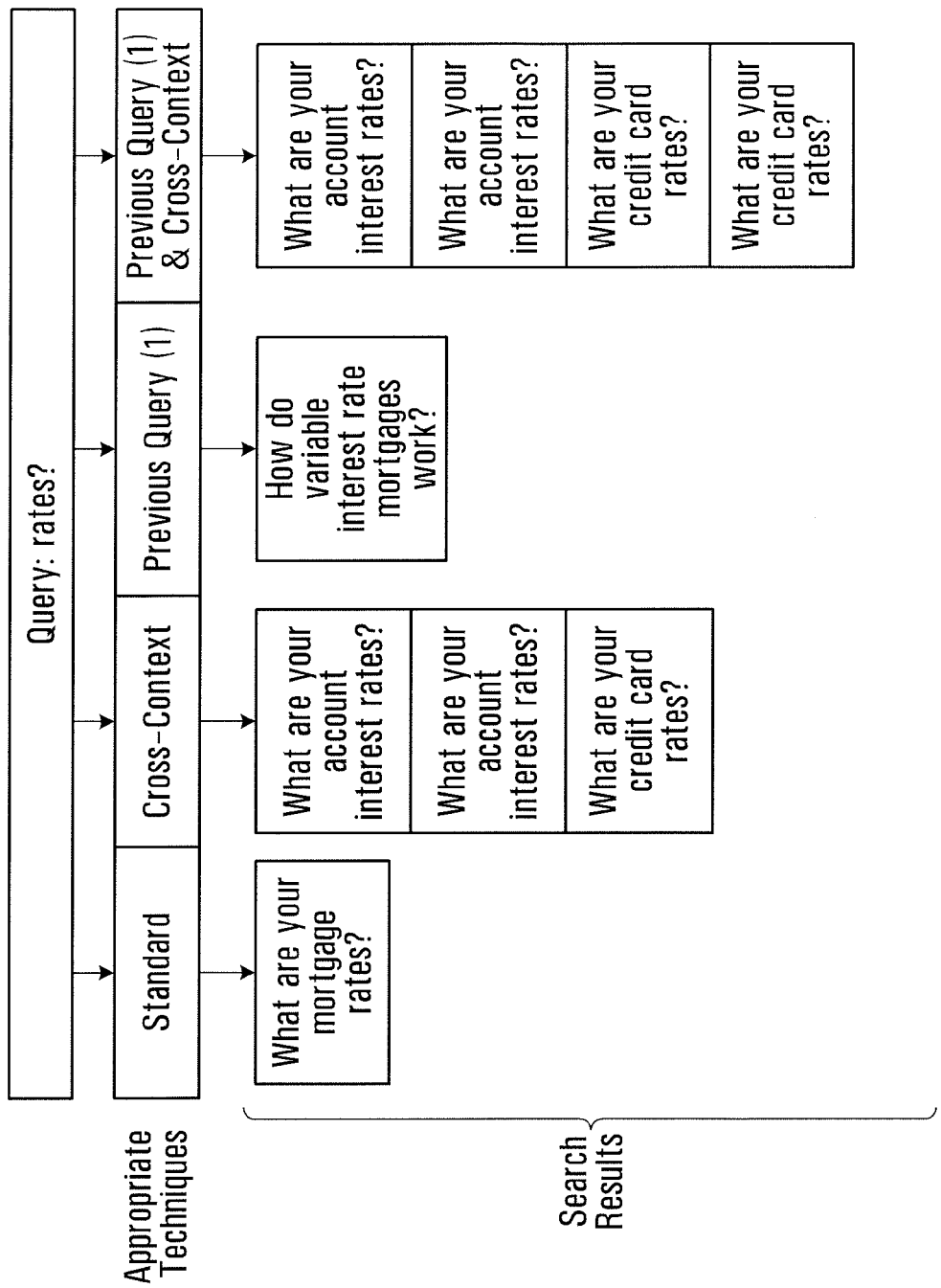
FIG. 9 illustrates using the matching techniques of FIG. 7 to provide search results matched to the user query of FIGS. 7 and 8.

At block S616, supplemented search module 48 uses the submodules implementing matching techniques determined to be appropriate for the current state to search for information matched to the supplemented user query, as illustrated in FIG. 9. Each of these submodules provides a set of search results matching the user query, in the form of stored queries and associated stored responses for those stored queries. As depicted, the search result provided by the Standard matching technique, namely "What are your mortgage rates?", is the same search result that was earlier provided by initial search module 42. Each submodule also provides degree-of-match scores to indicate the quality of match between each of the search results and the user query.

Next at block S618, supplemented search module 48 modifies the degree-of-match scores provided by the matching technique submodules using the modified technique weights. FIG. 10 is a table depicting the degree-of-match score and modified degree-of-match score for each search result. Supplemented search module 48 combines the search results from its submodules to form a single set of search results.

At block S620, filter module 50 filters the set of search results collated by supplemented search module 48 to eliminate duplicate search results. FIG. 11 is a table depicting the search results listed shown in FIG. 10 with search results eliminated by filter module 50 shown with hatched lines. Finally, at block S622, the remaining search result having the highest modified degree-of-match score is selected. As illustrated in FIG. 11, the selected search result "How do variable interest rate mortgages work?", having a modified degree-of-match score of 3.5 (shown in FIG. 11 with a bolded border). This selected search result is presented to the user.

In some embodiments of the present invention, some or all of matching technique submodules of the supplemented search module 48 may not provide degree-of-match scores to indicate the estimated quality of match between search results provided and the user query. In these embodiments, supplemented search module 48 may assign each search result a default degree-of-match score, or assign each search result a degree-of-match score based on the technique value or the modified technique value.

In some embodiments of the present invention, each context/database may be assigned a context weight that indicates the expected likelihood that the context includes a search result that satisfies the user query. Like the default technique weights, context weights are typically assigned by the operator or administrator of server 12. In these embodiments, supplemented search module 48 may further modify degree-of-match scores using the context weights.

Of course, the above described embodiments are intended to be illustrative only and in no way limiting. The described embodiments of carrying out the invention are susceptible to many modifications of form, arrangement of parts, details and order of operation. For example, software (or components thereof) described at computing device 12 may be hosted at several devices. Software implemented in the modules and submodules described above could be using more or fewer modules and submodules. The invention, rather, is intended to encompass all such modification within its scope, as defined by the claims.

What is claimed is:

1. A computer-implemented method of user query response comprising:
   receiving a user query from a user at a client device;
   obtaining at the client device a result of:
      matching the user query to stored responses to obtain an initial set of matched responses;
      calculating a confidence metric indicating the likelihood of the initial set of matched responses satisfying the user query;
      in response to determining the confidence metric indicating the likelihood of the initial set of matched responses satisfying the user query to be below a specified threshold supplementing the user query with a plurality of contextual data comprising at least one of:

1) a count of previously received user queries from the user, 2) a count of responses in the initial set of matched responses, 3) a count of words in the user query, 4) a total count of databases in which responses are stored, and 5) a count of databases selected by the user in which responses are stored; and further matching the user query, supplemented by the plurality of contextual data, to stored responses by applying a plurality of disparate matching techniques to obtain a further set of matched responses;

for each matched response in the further set of matched responses, calculating a degree-of-match metric indicating a quality of match between that matched response and the user query, the calculating taking into account the plurality of contextual data; and presenting at least one matched response, based on the result, of the initial set of matched responses and the further set of matched responses to the user wherein at least one of the plurality of disparate matching techniques differs from techniques used to obtain the initial set of matched responses.

2. The method of claim 1 further comprising ranking matched responses in the further set of matched responses, and wherein the presenting comprises presenting at least one matched response of the further set of matched responses responsive to the ranking.

3. The method of claim 2, wherein the ranking takes into account the degree-of match metrics calculated for matched responses in the further set of matched responses.

4. The method of claim 1, further comprising, for each matched response in the initial set of matched responses, calculating a degree-of-match metric indicating a quality of match between that matched response and the user query.

5. The method of claim 4, further comprising ranking matched responses in the initial set of matched responses and matched responses in the further set of matched responses, and wherein the presenting comprises presenting at least one matched response of the initial set of matched responses or the further set of matched responses responsive to the ranking.

6. The method of claim 5, wherein the ranking takes into account the degree-of-match metrics calculated for matched responses in the initial set of matched responses and matched responses in the further set of matched responses.

7. The method of claim 1, wherein the matching the user query to stored responses comprises matching the user query to responses stored in at least one database.

8. The method of claim 7 wherein the further matching comprises matching the user query to responses stored in additional a set of databases in which the responses are stored.

9. The method of claim 1, wherein the plurality of contextual data comprises previously received user queries from the user.

10. The method of claim 1, further comprising filtering matched responses in at least the further set of matched responses to remove duplicate matched responses, and wherein the presenting is responsive to the filtering.

11. The method of claim 1, further comprising filtering matched responses in the initial set of matched responses and matched responses in the further set of matched responses to remove duplicate matched responses, and wherein the presenting is responsive to the filtering.

12. The method of claim 1, further comprising selecting the plurality of disparate matching techniques from available matching techniques.

13. The method of claim 12, wherein the selecting comprises determining those matching techniques of the available matching techniques appropriate for the user query, the determining taking into account the plurality of contextual data.

14. The method of claim 1, wherein the calculating the degree-of-match metrics takes into account a plurality of technique weights respectively assigned to each of the plurality of disparate matching techniques, each of the technique weights indicating a likelihood that the associated matching technique of the plurality of disparate matching techniques will provide one or more matched responses satisfying the user query.

15. The method of claim 14, wherein the calculating the degree-of-match metrics comprises modifying the technique weights, the modifying taking into account the plurality of contextual data.

16. The method of claim 1, wherein the calculating the degree-of-match metrics takes into account a plurality of database weights respectively assigned to each of the set of databases, each of the database weights indicating a likelihood that the associated database of the set of databases stores one or more matched responses satisfying the user query.

17. The method of claim 1, wherein each of the plurality of disparate matching techniques differs from techniques used to obtain the initial set of matched responses.

18. A non-transitory computer-readable medium storing instructions which when executed adapt a computing device to:

receive a user query from a user at a client device;
obtain at the client device a result of:
matching the user query to stored responses to form an initial set of matched responses;
calculating a confidence metric indicating a likelihood of the initial set of matched responses satisfying the user query;
determining if the confidence metric is below a specified threshold, and in response to determining that the confidence metric is below a specified threshold supplementing the user query with a plurality of contextual data comprising at least one of:
1) a count of previously received user queries from the user, 2) a count of responses in the initial set of matched responses, 3a count of words in the user query, 4) a total count of databases in which responses are stored, and 5) a count of databases selected by the user in which responses are stored; and further matching the user query, supplemented by the plurality of contextual data, to stored responses by applying a plurality of disparate matching techniques to obtain a further set of matched responses;

for each matched response in the further set of matched responses, calculating a degree-of-match metric, taking into account the plurality of contextual data, the degree-of-match metric indicating a quality of match between that matched response and the user query; and present at least one matched response, based on the result, of the initial set of matched responses and the further set of matched responses to the user, wherein at least one of the plurality of disparate matching techniques differs from techniques used to obtain the initial set of matched responses.

* * * * *

UNITED STATES PATENT AND TRADEMARK OFFICE
CERTIFICATE OF CORRECTION

PATENT NO. : 9,519,689 B2
APPLICATION NO. : 14/615139
DATED : December 13, 2016
INVENTOR(S) : Darren Redfern et al.

Page 1 of 1

It is certified that error appears in the above-identified patent and that said Letters Patent is hereby corrected as shown below:

In the Claims

Claim 18, Column 18, Line 45 "3a count of words" should read -- 3) a count of words --

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*